June 15, 1965
G. R. JOBE
3,189,075
VIBRATION RESISTANT BOLT FASTENER
Filed Aug. 6, 1963
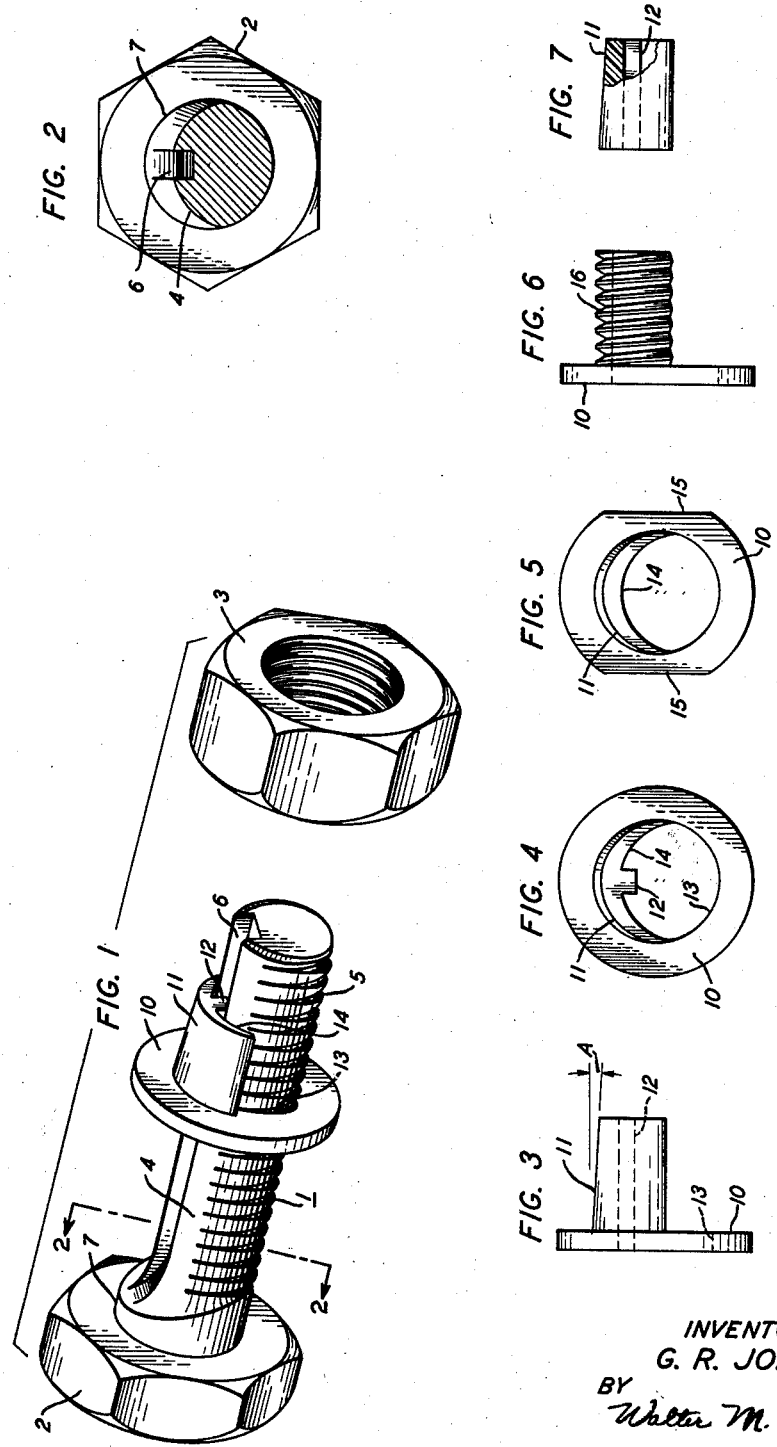
INVENTOR
G. R. JOBE
BY
*Walter M. Hill*
ATTORNEY

United States Patent Office 3,189,075
Patented June 15, 1965

3,189,075
VIBRATION RESISTANT BOLT FASTENER
Garland R. Jobe, Greensboro, N.C., assignor to Bell Telephone Laboratories, Incorporated, New York, N.Y., a corporation of New York
Filed Aug. 6, 1963, Ser. No. 300,370
11 Claims. (Cl. 151—7)

This invention relates to an article of manufacture and more particularly to a reusable, rapidly applied and removed vibration resistant bolt fastener.

The invention is particularly useful for securing assembled apparatus to its crate or box during shipment or as a hold-down fastener for machine tools during machining operations. It is desirable that such a fastener be rapidly applied, be secure against looseness from vibration and be rapidly removed. To be economically and practically successful in these applications it is also essential that the fastener be simple in construction, be easily and economically manufactured and be reusable.

It is an object of this invention to rapidly secure parts together so that they may be shipped or operated upon under conditions which may involve vibration and that they are readily separated again when desired.

The foregoing object is achieved by this invention which comprises a vibration-resistant bolt fastener in which a bolt has its threads removed along one side so that a nut may be slid along its length without engaging the threads. A friction insert, preferably of nylon, completes the threads at the point where the threads are to engage. This insert is tapered so that friction with the threads increases as the nut is tightened. A washer may be made integral with the friction insert so that the complete fastener assembly comprises only three parts. Alternatively, the friction insert may contain partial threads to facilitate assembly.

The invention may be better understood by reference to the accompanying drawings, in which:

FIG. 1 illustrates an embodiment of the invention in the form of a modified standard bolt with a friction insert mounted thereon;

FIG. 2 shows a section through the shaft of the bolt in FIG. 1;

FIGS. 3 and 4 show the side and end views of a preferred construction of the friction insert;

FIG. 5 shows an alternative construction of the friction insert in which rotation of the insert is prevented by means of a wrench instead of the key shown in FIG. 4;

FIG. 6 is an alternative construction of the insert shown in FIG. 5 in which partial threads have been formed on the outer surface of the tapered portion of the insert; and FIG. 7 is a still further embodiment of a friction insert without the annular flange at one end thereof.

FIG. 1 is illustrative of a preferred embodiment of the invention in which a standard bolt 1 having a head 2 is shown with the threads removed along one side of the shaft to form a smooth surface 4. Sufficient threads are removed to permit sliding a nut 3 along the length of the shaft without the necessity of rotating the nut. This is illustrated in FIG. 2 which is a section taken on the line 2—2 of FIG. 1. The horizontal distance across the bolt shaft is made slightly less than the internal diameter of the nut. The surface 4, that has been formed by removing the threads along one side of the bolt, has a radius equal to the internal radius of the nut or approximately equal to the root radius of the thread on the bolt shaft. The original diameter of the bolt shaft is shown at 7 in both FIGS. 1 and 2 and this diameter is approximately equal to the outside thread diameter of the bolt. A keyway 6 has been cut along the length of the bolt as illustrated in these figures.

In practice, it is desired to secure some parts, not shown, between the bolt head 2 and the nut 3 and, in order for the nut to securely engage the threads in the bolt, a friction insert having an annular flange 10 and a tapered portion 11, as illustrated in FIG. 1, is slid over the end of the bolt shaft until the bolt head and the adjacent surface of flange 10 engage the parts to be secured by the bolt. The nut is then slid down the bolt until about one-third of the tapered portion 11 of the friction insert enters the nut. At this point the threads begin to engage and, as the nut is turned down in the normal manner, a broaching action takes place between the nut threads and the tapered portion 11. Since the tapered portion 11 increases in thickness from its outer end toward the flange 10, this broaching action increases in intensity as the nut approaches the flange 10, thereby increasing the friction in the threads to secure the parts together.

The friction insert shown in FIG. 1 is disclosed in greater detail in FIGS. 3 and 4. Here it will be noted that flange 10 is of substantially annular form having an opening 13 through which the bolt shaft may enter. The convex outer surface 11 has an opposing concave inner surface 14, the latter being dimensioned so as to be complementary to the smooth surface 4 on the bolt shaft. A key 12 is complementary to the keyway 6 and may run along the entire length of the inner surface 14. The taper of the outer surface 11 is shown to have an angle A which, in practice, may be in the order of about three degrees, although this angle is not critical and will depend somewhat upon the material of which the friction insert is made.

FIG. 5 illustrates an alternative construction of the friction insert in which the key and keyway of FIGS. 1 through 4 are not used. In this case, rotation of the friction insert about the bolt shaft is prevented by forming a pair of opposing flats 15 on the flange 10. These flats may be engaged by a thin wrench in conventional manner to hold the insert against rotation as the nut is turned down.

With some materials, it is desirable to form partial threads on the outer surface of the tapered portion 11. This is illustrated in FIG. 6 where threads 16 of substantially the same pitch as for the bolt have been formed so as to constitute substantially 70 percent complete threads, the exact percentage not being critical. As the nut is applied, the remaining material in the threads of the insert presents resistance to rotation so that the nut will not be loosened by vibration after being applied. As FIG. 6 illustrates a modification of FIG. 5, no key has been shown. However, it is quite evident that preformed partial threads may also be applied to the embodiment shown in FIGS. 3 and 4.

FIG. 7 illustrates a still further alternative embodiment of the friction insert in which no annular flange is used. In this case it is preferable that rotation of the insert about the bolt shaft be prevented by a key 12 such as illustrated in FIG. 4. Here, again, the outer surface 11 is illustrated without threads but may have preformed partial threads as shown in FIG. 6. This friction insert may be used either with a conventional washer or by simply drawing the nut 3 directly against the parts to be secured.

It will be evident that this fastener may be readily disassembled by merely backing off the nut 3 until it clears the friction insert after which the nut may be slid, without rotation, completely off the bolt shaft. Because the nut may be rapidly slid along the length of the bolt shaft to the point where it is to engage the threads, considerable time is saved in the assembly and disassembly of the fasteners. Moreover, the bolts may be of any length suitable for the intended purpose and regardless of their lengths, their assembly time will remain about the same.

In the practice of this invention, the friction insert is preferably made of nylon, although other materials having similar mechanical properties may be used. When made of nylon or other plastic material, these inserts may be easily molded and thereby economically made in large quantities. It has been found that nylon inserts may be repeatedly used many times before they become unreliable. Although there are a number of different nylons available on the market and the particular nylon to be selected is not critical, it has been found that some of the crystalline nylons, as for example, polyhexamethylene-adipamide, polyhexamethylene-sebacamide and polycaprolactam are readily molded and work quite satisfactory. The above three nylons are known in commerce as Nylon 66, Nylon 610 and Nylon 6, respectively. It is also evident that other materials having similar resilience and frictional properties and which do not readily cold flow may be substituted without departing from the invention.

What is claimed is:

1. A vibration resistant bolt fastener comprising a bolt having a threaded shaft to fit the thread in a nut, a portion of the threads removed from one side of the bolt shaft to form a smooth convexly curved surface and a maximum cross section dimension less than the internal diameter of the nut thread so that the shaft may slidably receive said nut without relative rotary motion of the nut about the shaft, a friction insert of material softer than said nut for placement between said shaft and said nut, said insert having a concave inner surface complementary to said smooth convexly curved surface and an opposing convex outer surface, the thickness between said concave and convex surfaces gradually increasing from one end of the insert to its opposite end so as to increase the friction between the insert and the threads of said nut as the nut is turned to tightness on the bolt shaft, and means on said insert preventing its rotation about said shaft as said nut is turned thereon.

2. The combination of claim 1 wherein the convex outer surface of said insert contains partially complete threads of substantially the same pitch as those on the bolt shaft.

3. The combination of claim 1 wherein said insert is made of nylon.

4. The combination of claim 2 wherein said insert is made of nylon.

5. The combination of claim 1 wherein said means for preventing rotation of the insert comprises a key integral with the concave inner surface of said insert and a keyway in the smooth surface of said bolt shaft complementary to and fitting said key.

6. A vibration resistant bolt fastener comprising a bolt having a threaded shaft to fit the thread in a nut, a portion of the threads removed from one side of the bolt shaft to form a smooth convexly curved surface and a maximum cross section dimension less than the internal diameter of the nut thread so that the shaft may slidably receive said nut without relative rotary motion of the nut about the shaft, a friction insert of material softer than said nut for placement between said shaft and said nut, said insert having a first substantially annular portion with an aperture to receive said shaft, a second portion integral with the first one and having a concave inner surface complementary to said convexly curved smooth surface and a convex outer surface, the thickness between said concave and convex surfaces gradually decreasing from the end adjacent said annular portion to its opposite end so that the friction increases between the insert and the threads of said nut as the nut is turned to tightness on the bolt shaft and against said annular portion, and means preventing rotation of said insert about said shaft as said nut is turned thereon.

7. The combination of claim 6 wherein the convex outer surface of said insert contains partially complete threads of substantially the same pitch as those on the bolt shaft.

8. The combination of claim 6 wherein said insert is made of nylon.

9. The combination of claim 7 wherein said insert is made of nylon.

10. The combination of claim 6 wherein said means for preventing rotation of the insert comprises a key integral with the concave inner surface of said insert and a keyway in the smooth surface of said bolt shaft complementary to and fitting said key.

11. The combination of claim 6 wherein said means comprises parallel opposed flats on the outer periphery of said annular portion to receive a wrench to restrain said insert from rotation about the bolt shaft.

References Cited by the Examiner

UNITED STATES PATENTS

| | | | |
|---|---|---|---|
| 1,364,298 | 1/21 | Nies | 151—8 |
| 2,631,357 | 3/53 | Gobel | 85—33 |
| 2,990,866 | 7/61 | Macy et al. | 151—14.5 |

EDWARD C. ALLEN, *Primary Examiner.*